(12) United States Patent
Guo

(10) Patent No.: US 7,437,763 B2
(45) Date of Patent: Oct. 14, 2008

(54) IN-CONTEXT SECURITY ADVISOR IN A COMPUTING ENVIRONMENT

(75) Inventor: Bei-Jing Guo, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 851 days.

(21) Appl. No.: 10/456,606

(22) Filed: Jun. 5, 2003

(65) Prior Publication Data

US 2004/0250107 A1 Dec. 9, 2004

(51) Int. Cl.
*G08B 23/00* (2006.01)

(52) U.S. Cl. .................................. 726/25; 726/1

(58) Field of Classification Search ................. None
See application file for complete search history.

(56) References Cited

U.S. PATENT DOCUMENTS

| | | | | |
|---|---|---|---|---|
| 6,647,400 | B1 * | 11/2003 | Moran | 707/205 |
| 7,007,301 | B2 * | 2/2006 | Crosbie et al. | 726/23 |
| 7,299,504 | B1 * | 11/2007 | Tiller et al. | 726/30 |
| 7,305,709 | B1 * | 12/2007 | Lymer et al. | 726/25 |
| 2002/0095591 | A1 * | 7/2002 | Daniell et al. | 713/200 |
| 2002/0116631 | A1 * | 8/2002 | Torii et al. | 713/200 |
| 2003/0140246 | A1 * | 7/2003 | Kammer et al. | 713/201 |
| 2004/0019807 | A1 * | 1/2004 | Freund | 713/201 |
| 2004/0049698 | A1 * | 3/2004 | Ott et al. | 713/201 |
| 2004/0123141 | A1 * | 6/2004 | Yadav | 713/201 |

OTHER PUBLICATIONS

Microsoft Computer Dictionary☐☐2002☐☐Microsoft Press☐☐Fifth Edition☐☐p. 47.*

* cited by examiner

*Primary Examiner*—Emmanuel L Moise
*Assistant Examiner*—David J Pearson
(74) *Attorney, Agent, or Firm*—Workman Nydegger

(57) ABSTRACT

Provided is an in-context security advisor that unifies computer system security, and generally improves computer system security by proactively and reactively monitoring for changes to security settings made by users and programs. By operating in real time, advice comprising meaningful feedback is given for any intrusion, thus giving a user the proper context about the consequences of changes to security settings that negatively affect the level of protection on computer systems, and allowing automated correction. Files can also be monitored, e.g., to prevent certain files from being remotely accessed or transmitted. The security advisor may adjust its operation based on user preferences, policy information, and via a connection to a remote source such as a backend server. The security advisor can also output security-related information, such as to a log and/or to components that evaluate the overall health of the machine.

56 Claims, 4 Drawing Sheets

IN-CONTEXT SECURITY ADVISOR IN A COMPUTING ENVIRONMENT

FIELD OF THE INVENTION

The invention relates generally to computer systems, and more particularly to computer security.

BACKGROUND OF THE INVENTION

With the growth of computing in general, and the fact that much of today's computing revolves around connectivity to other computer systems to exchange information, security has become an important part of computing. Even though there are various ways users can protect their computer systems against external attacks, hackers are able exploit weaknesses in users' computer configurations, as well as weaknesses in human nature, to attack computers. In part, this is because contemporary security models are complex to users, and some security settings are difficult for users to understand, yet rely on the user to manage and make decisions on security.

For example, contemporary computer users have a number of security settings on their computers that are critical to providing protection from hackers, viruses and rogue programs. The critical nature of these settings dictates that they should not be altered by third parties without user permission, however this is often not the situation with users' computer systems as many malicious computer programs can easily change security settings on a computer without the computer user's explicit knowledge of the change or changes. Furthermore, users may intentionally attempt to change certain settings themselves without completely realizing the security impact of their actions, e.g., a user may lower the security level to temporarily allow some unusual behavior (such as to load a control from a trusted site), but then forget to restore the level to its higher setting.

In sum, users need some level of connectivity to other users' computers, yet have to balance this need for connectivity against some level of vulnerability. Security bulletins and the like are only effective to the extent that users read them and act accordingly. Antivirus programs, firewalls, security patches and other downloads can only prevent certain types of security issues from being exploited, and even then may be too late for many users. In sum, what is needed is a method and system that reduces the complexity of dealing with various security issues and can notify the user of various potential security vulnerabilities, at times when it matters, not after it is too late.

SUMMARY OF THE INVENTION

Briefly, the present invention provides a system and method that monitors and advises computer users in real-time as to security related events. This typically includes real-time monitoring for changes to security settings that are initiated by users or any third parties such as application programs that can affect (e.g., diminish) the level of protection on the computer systems, and informing users about the consequences of such changes. In one implementation, a user receives a warning from a security advisor service when a setting is changed or is about to be changed, along with an explanation as to why and/or how the change will diminish the user's protection level. In this way, the user retains control of the machine's settings, but the security advisor can ensure that the user understands the consequences of any security-related action. Further, because the warning is in real-time, the warning appears in the current context of what the user is doing, helping the user recognize and understand the security issue.

In general a security service is provided in software to monitor a user's security settings in real-time. When any of the monitored security settings are changed or are to be changed, by the user or by some application, and the change is related to security (e.g., increases vulnerability), the security service acts in some way, such as to alert the user of the change, provide an explanation about the potential consequences of the change, and offer the user options and recommended solutions. The actions taken may be automatic or may involve the user, and may be based on user configurable action preferences, hardcoded data, downloaded data, performed by default data, or some combination of the above for the many possible security settings on a given machine. Per-user preferences allow the security advisor to operate differently for different users, e.g., default preferences and other settings may vary for a consumer home user versus a business user, an adult versus a child, a sophisticated user versus a novice user, an administrator versus a guest user, and/or virtually any other distinctions that make sense. There may be any number of levels, e.g., a power user level may be somewhere between an administrator level and a guest level.

To monitor and advise, the security service, comprising an in-context security advisor (or simply a security advisor), monitors security-related events such as actual or proposed changes to security settings, and takes actions in response, such as outputting prompts to the user, writing to a log, and/or possibly performing automated actions to prevent (e.g., block or undo) the change from potentially causing damage. The monitoring may be proactive, e.g., by hooking messages, APIs and so forth to monitor for changes to settings before the settings are actually changed, or reactive, e.g., by watching logs, the registry and other such data structures to note when changes have been made. Files can also be monitored by the present invention, e.g., to prevent certain files from leaving the machine.

Based on defaults and/or user preference data, the in-context security advisor can educate users about potential security vulnerabilities and possible solutions, and make a recommendation at the time the security vulnerability is introduced, whether by explicit user action or implicit actions performed by other applications or users. This feature improves users' security awareness, exposes potential security attacks, and prepares users to make educated decisions, thereby increasing security and building trust with the computer user.

The security advisor is a dynamic service that can adjust its operation based on user preferences, policy information, and/or via a connection to a backend server or the like. Automatic updates are performed from the backend server to give the security advisor updated information, such as information about new security attacks and what to do to prevent or correct them, to change default security settings to protect against certain known dangers, revise prompts and explanations, and so forth. The security advisor can also output security information to the backend server, as well as to logs and/or to components that determine the overall health of the machine.

In one implementation, the in-context security advisor operates in an "always on" state to watch security settings in real-time, whereby advice may be given at the time of intrusion, thus giving a user (or a log) the proper context. Automatic correction may be provided to give the user the option to automatically correct and/or block potential security threats.

Other advantages will become apparent from the following detailed description when taken in conjunction with the drawings, in which:

DETAILED DESCRIPTION

Exemplary Operating Environment

Figure 1:
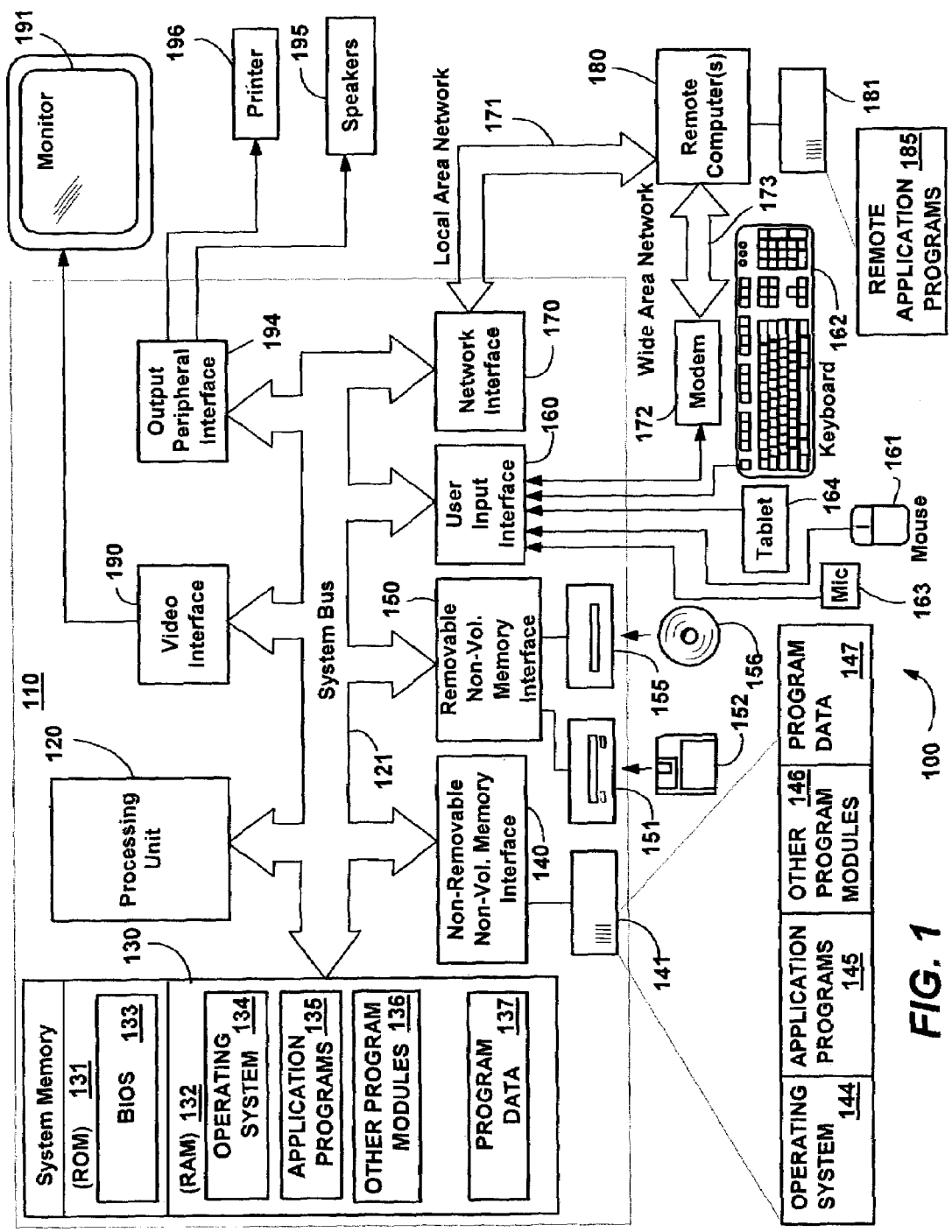
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In-Context Security Advisor

The present invention is, in part, directed towards a service that may be within an overall computer security system, and includes an in-context security advisor component that performs real-time monitoring of security-related events. Among other characteristics, the service unifies various existing security mechanisms, such as antivirus, firewall and intrusion detection mechanisms, so that the user views security from a single, common source, rather than from multiple independent sources. Further, as will be understood, other security-related events are monitored by the service, such as those that the user performs, e.g., changing a registry setting, adding a guest account without a password, running a script that changes an internet security zone or changing one manually, running a macro, loading a control (e.g., an ActiveX® control) and so on. Applications can also change security settings and otherwise alter a system's security, e.g., by changing settings in the registry, by running script, accessing cookies, and so on, and the in-context security advisor monitors those events, also in real time.

Advice may be provided by the in-context security advisor, to educate users about potential security vulnerabilities and possible solutions, and to make a recommendation at the time the security vulnerability is introduced. This real-time advice can occur whether the security is being compromised by explicit user action or implicit actions performed by other applications or users. This feature improves users' security awareness, exposes potential security attacks, and prepares users to make educated decisions, thereby increases security and building trust with the computer user.

In general, the in-context security advisor comprises one or more software components that monitor a user's security settings in real-time. When any of these monitored security settings may be changed (either by the user or by some applications) in a manner that results in a security vulnerability, the in-context security advisor software may take an action, such as an automated action to prevent the change, and/or to alert the user of the change, provide an explanation about potential consequences of the change, and offer the user options and recommended solutions. As will be understood, however, the present invention is not limited to any particular security events or actions, but rather has many applications in computer system security.

Figure 2:
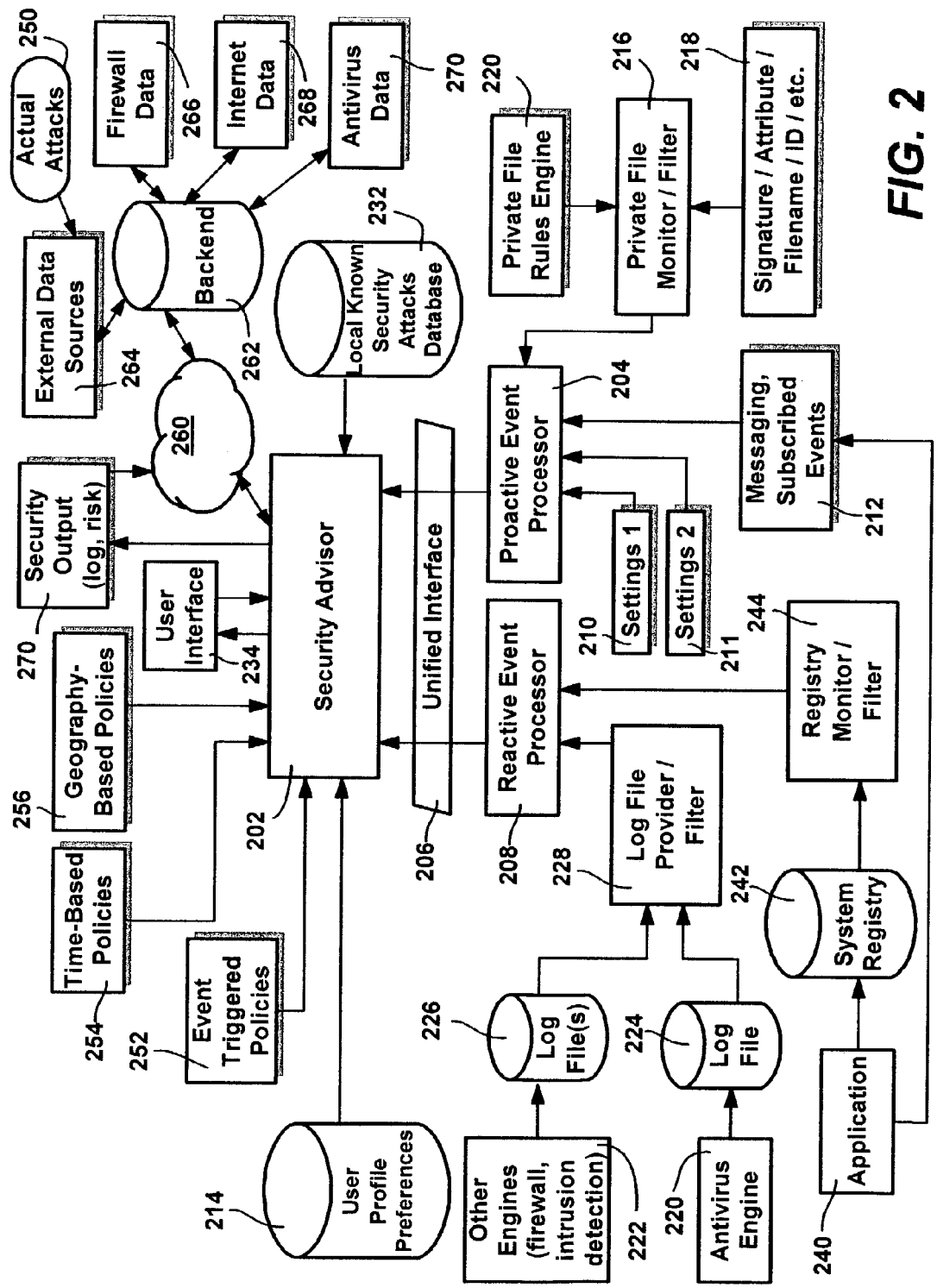
FIG. 2 is a block diagram generally representing a security advisor that monitors for various security-related events and takes appropriate actions in accordance with an aspect of the present invention.

Turning to FIG. 2 of the drawings, there is provided an example representation of a security advisor 202 having an arbitrary number of coupled components that provide security-related information, directly or indirectly. In general, the security advisor 202 monitors security-related events and takes action based on those security-related events. Typical actions include outputting prompts to the user, writing to a log, outputting a value indicative of the state of security of the computer system, advising the user and further operating based on a user decision, automatically blocking a change to a setting, performing an automatic restoration of a changed setting, and receiving updates.

In one implementation, the security advisor 202 may monitor for security-related events in two general ways, namely proactively and reactively. Proactive monitoring is represented in FIG. 2 by the proactive event processor 204, connected via a unified interface 206, and generally refers to monitoring for changes to settings before the settings are actually changed. For example, messaging (such as messaging between windows) may be watched, subscribed events may be registered for notifications, and system or application settings and the like may be monitored. In general, anything that the security advisor 202 has enough knowledge about to hook, such as known application programming interface calls, may be proactively monitored, as represented in FIG. 2 by components numbered 210-212 (which also represent operating system settings, internet settings such as security zone-based settings, and so forth). The proactive event processor can ignore or discard anything irrelevant to security or which the security advisor 202 has decided not to take actions on.

In general, in one implementation, the user decides on how the communication with the security advisor is to occur, (e.g., what level of details to provide, such as based on how technical the user is), and what options the user should be provided with (e.g., whether the security advisor should let the user make every decision, or provide a recommended decision, or take automatic actions for the user). Note that in alternative implementations, the user may be allowed to control, at least to an extent, what information is being monitored, e.g., user preferences can maintain such information.

Files can also be monitored by the present invention. For example, a private file filter 216 may watch for files, as identified by signature, parent directory, filename, file identifier, file attributes or the like, represented in FIG. 2 by the block labeled 218. Actions involving those files can be detected, e.g., by a filter driver in the driver stack in a Windows® XP-based system, (or by the file system or in other ways) and a security-related action taken with respect thereto. For example, certain files could be prevented from being emailed to anyone, or accessed by a macro, regardless of access rights. A private file rules engine 220 may also be used to determine filtering criteria, e.g., do not allow a file to be accessed on weekends or emailed to someone other than a specific email address.

For other security-related components that cannot be hooked, such as third party antivirus products 222 and firewall/intrusion detection (that evaluates network packets for known attacks) mechanisms 224, the respective log files 226 and 228 are watched to determine what happened with respect to security. A log file provider/filter 228 reports relevant security-related log entries to the reactive event processor 208, which then calls the security advisor 202. As described below, the security advisor 202 can then take an appropriate action, such as based on a local known security attacks database 232, which contains knowledge of security attacks and what to do with them, which may include informing the user of what occurred via a user interface 234.

Similarly, application programs 240 can write to the system (or other) registry 242 or the like, which can impact security. The registry 242 can be monitored and filtered by a component 244, which likewise can report the event to the reactive event processor 208. Web applications can attempt to change defaults, e.g., to take over a default applications handler to change one default application to its own application program, which can be monitored.

As is understood, such components may be external to the security advisor 202, or may be incorporated into the security advisor 202. For example, the security advisor 202 may be implemented in a COM object having defined interfaces, whereby the proactive and reactive event processors 204 and 208 could plug into the security advisor 202. Alternatively, the proactive and reactive event processors 204 and 208 (and possibly the filters 216, 228 and 244) could be incorporated into the security advisor 202.

In this manner, the security advisor 202 acts as a centralized monitor for security-related events, particularly for changes to anything that involves a security setting. Typically these will be events that diminish security, but it is also possible to inform the user when security is increased, or even simply evaluated. For example, a user may want to know whether a website has attempted to run a script that accesses some security settings, even when no change is made.

It should be noted that the security advisor 202 is not a static program, but rather comprises a dynamic service. Thus, another aspect of the security advisor 202 represented in FIG. 2 is directed to policy information, in which the security advisor 202 can vary its operation based on policy and obtain the latest knowledge of new security attacks and what preventative or reactive actions to take against those attacks. For example, knowledge of and/or actual attacks 250 detected on computer systems can be used to generate actions 232 that change the security advisor's behavior, e.g., to change security settings, block certain actions, perform automatic correction and/or vary the warning given or the criteria for giving a warning. Time-based policies 254 may also apply, (e.g., more secure during hours when the office is closed), and/or geography-based policies 256 (e.g., more secure when traveling). Other policies not shown, such as policy based on connecting to a different network, are also feasible. In general, anything that varies can be used as a criterion that alters the operation of the security advisor 202.

By way of an example explanation, in one implementation, the Local Known Security Attacks database 232 contains knowledge of security attacks and what to do with them (actions to take), while the event triggered policies 252 contain policy about what to do when a certain event occurs. For example, consider a virus attack that when run cleans out a user's main documents directory. The security advisor 202 obtains this knowledge from the backend 262 through its regular updates, which is written to the local database 232 by the security advisor 202. The data may include the signature of the virus, an explanation of the virus, any possible cure for the virus, or if there is no cure, what options user might have. The event triggered policies 252 has a policy that essentially states that in case a virus is found and a file is corrupted, the system should try to restore the original uninfected file from backups.

Another way in which the security advisor 202 operates as a dynamic service is via a connection 260 (e.g., internet-based) to a backend server 262. Automatic (or possibly manual) updates are performed to give the security advisor 202 whatever information it needs to better advise and protect users. External data sources 264 such as provided by a trusted program producer, can, for example, change default security settings to protect against certain known dangers, such as a malicious web site. Firewall-related data 266, internet-related data 268, antivirus-related data 270 and so forth can be downloaded to the security advisor 202 to influence its operation. Further, the security advisor 202 can report security issues to the backend server 262, whereby information about security is published, e.g., trends and the like among many security advisors on other users' machines can be detected and acted upon. In general, the backend server 262 continues to learn about new security risks and can regularly update the security advisor 202 based on the knowledge learned.

Another aspect of the security advisor 202 is directed to the output of security-related data to other programs and the like, represented in FIG. 2 by block 270. In general, the security advisor 202 can log security-related information and/or output a score (or scores) based on the various security-related settings and security-related measures a user has active. For example, whether a user has an antivirus program with the latest signature can be reported (e.g., as a risk score), as well as the internet security zones, which can be used in a factor to report the overall health of a system to a user. The overall health can also feed back to the security advisor 202, e.g., to raise security so as to meet some minimal security level.

Similarly, logged data can be intelligently processed, for example to see whether a lot of attacks have been attempted, and the security level altered (and/or prompts changed) based on the security output log. This log 270 may be uploaded to the backend server 262.

Figure 3:
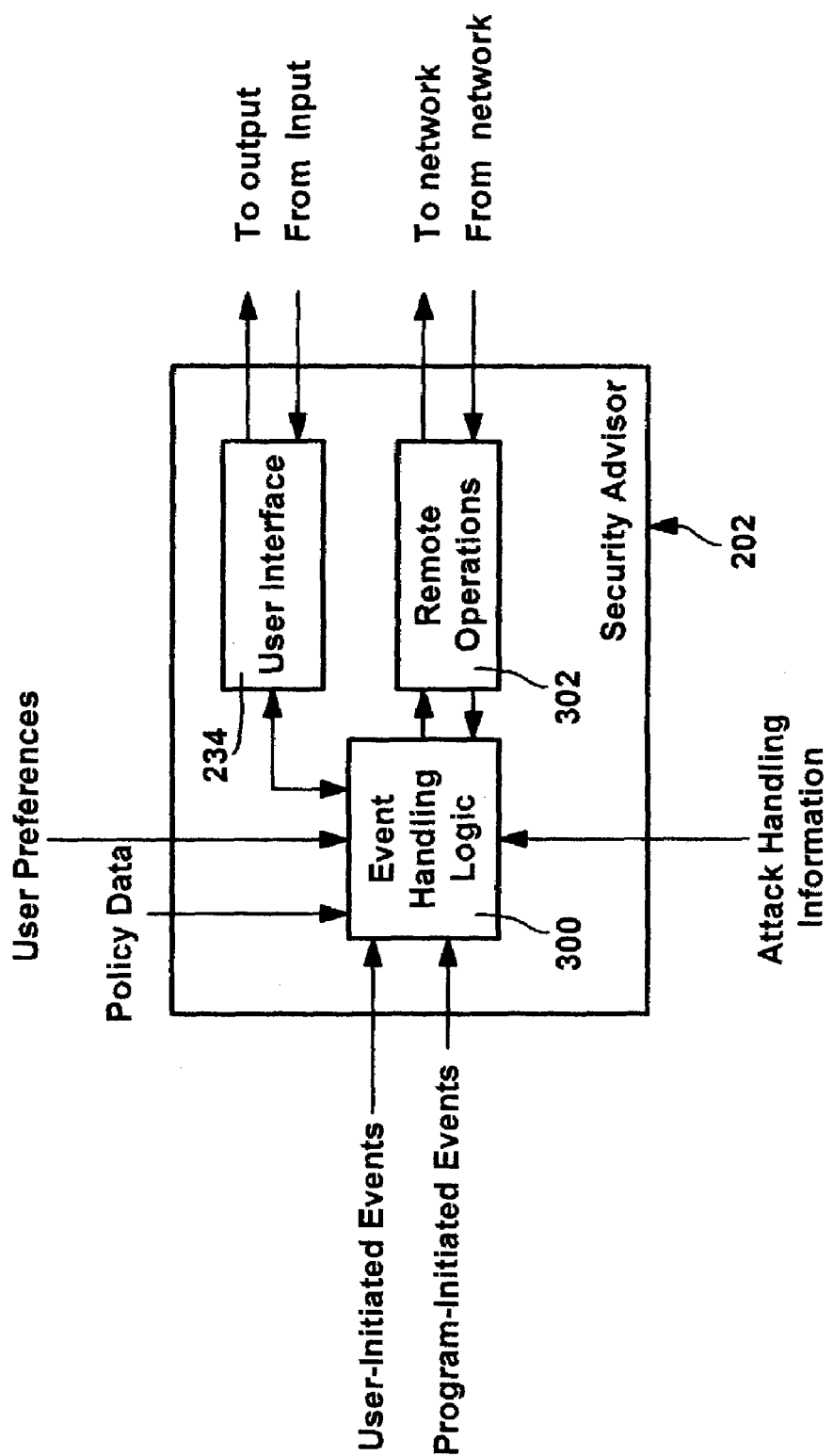
FIG. 3 is a block diagram generally representing components of the security advisor of FIG. 2 in accordance with an aspect of the present invention.

FIG. 3 shows the general operation of the security advisor 202, which in one implementation is always running in the background to watch what the user and other programs are doing to the machine with respect to security. As described above, based on policy data and user preferences, along with action preferences, the security advisor 202 includes event handling logic 300 that responds to user-initiated events and program-initiated (e.g., applications, website scripts or controls) events, such as by outputting data. The output data may comprise a prompt to a user, to inform the user as to what is occurring and recommend an action to take. Output data may also comprise data for logging, e.g., for later analysis.

In addition to (or instead of) outputting data, other actions are feasible, including proactively blocking a change to a security setting, or reactively undoing a change, which is possible if the prior setting is preserved, cleaning up a virus, and so forth. The actions may be automatic or set to be automatic, or proceeded by a prompt, and the prompt may be bypassed (e.g., a checkbox that can be set so as to not show a particular warning again).

The security advisor need not operate in the same way for each user, and indeed, a consumer home user may have very different preferences from a business user. Parents may have different preferences from children, and/or preferences may vary based on a sophisticated user versus a novice user, or some level of sophistication. For example, a sophisticated user may want a lot of information about what occurred, whereas a novice user may want the machine set to automatically do what is correct from a security perspective. Default (and possibly some fixed) preferences may be obtained by subscription, by manually selecting a level, by defaulting relative to a group (e.g., administrator versus power user) or virtually any other selection and distribution criteria.

Figure 4:
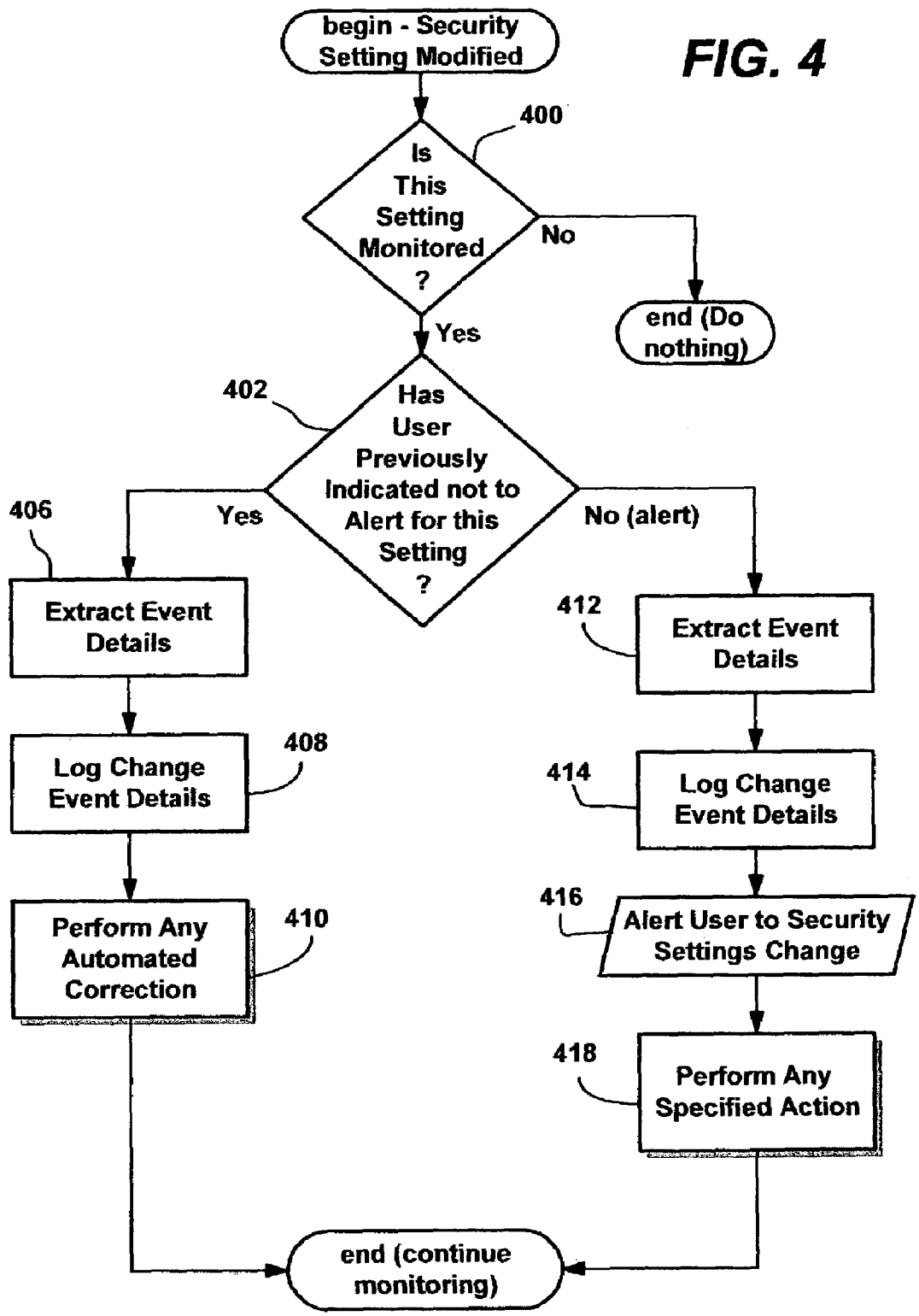
FIG. 4 is a flow diagram generally representing a process in the security advisor for operating in response to a security-related event in accordance with an aspect of the present invention.

Turning to an explanation of the event handling logic 300, FIG. 4 represents a general, logical flow of operations when a security setting has been modified (or is about to be modified). Step 400 represents determining whether the particular security setting is one that is monitored. As described above, user preference data and/or policy data may factor in this decision. If not, the security monitor does nothing.

If the setting is one that is monitored, step 400 branches to step 402 which tests whether the user has previously indicated not to be alerted for this setting. User preference data is accessed for this information, although it should be noted that policy, time, and so forth may change or override this preference data, e.g., the user may be notified despite having requested not be alerted if policy changes the setting because a particularly bad attack is prevalent on the user's network. Typically, however, the user preference data may be left intact and honored.

Steps 406 and 408 are executed when the user is not to be alerted, and essentially represent extracting the event details, and logging the change event, whether actually performed or proposed and pending. Step 410 represents taking some automated corrective action, if any is set according to the user preference settings, such as undoing a change if made, blocking a pending change from being made, and so forth. Such an action would ordinarily likewise be logged.

If the user is instead to be alerted as determined at step 402, steps 412 and 414 are executed, and essentially represent extracting the event details, and logging the change event, whether actually performed or proposed and pending. Step 416 represents alerting the user to the change. The prompts may vary based on policy, and/or downloading of new prompts. Step 418 represents taking some action, which may include making the change or blocking the change if not made, ignoring the change if made, resetting the setting at some later time (e.g., to allow a one-time exception), sending an email, and virtually any other action. Such an action, if resulting in something different from what is logged, would ordinarily likewise be logged. Note that it is possible to automatically perform an action and also notify a user as to what was done.

As can be seen from the foregoing detailed description, there is provided a method and system for handling the real-time monitoring of computer security-related events. The method and system are flexible and extensible, and provide users with a unified, comprehensive and meaningful in-context way to interact with security at an appropriate level. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a system for monitoring the security of a computer system, the system comprising:
   a plurality of sources of security-related information;
   a connection to a backend server, wherein the backend server comprises data including firewall-related data, internet-related data, antivirus-related data including virus signature, explanation of the virus, and a possible cure for the virus, and data related to a plurality of security services operating on a plurality of machines;
   a source of policies comprising each of time-based policies, geography based policies, and event triggered policies; and
   a security service,
      the security service configured to monitor in real time the security-related information of the plurality of sources,
      the security service receiving updates from the backend server to update security settings,
      the security service including event handling logic which responds to user-initiated events and program-initiated events,
      the security service reporting security information to the backend server,
      the security service reporting the health of a monitored source to a user;
      the security service logging security-related information,
      the security service processing the logged information to determine if an attack has been attempted or if a security level has been altered,
      the security service determining actions based upon the policies, the actions comprising proactively blocking a change to a security setting and reactively undoing a change, the actions being determined dynamically based on policy and knowledge of new security attacks, actual attacks, and preventative and reactive actions to take against each attack, and
      the security service performing actions based on the security-related information, an action being performed automatically when indicated as automatic by the preferences and an action being performed after a preceding prompt when so indicated by the preferences, the preceding prompt varying based upon policy and upon downloaded prompt information.

2. The system of claim 1 further comprising a user interface, wherein one of the actions performed by the security system is to provide advice to a user of the computer system via the user interface.

3. The system of claim 2 wherein one of the actions performed by the security system is to receive an instruction from the user of the computer system via the user interface in conjunction with the advice.

4. The system of claim 1 wherein one of the actions is automatically performed by the security system.

5. The system of claim 1 further comprising a reactive processor component coupled to the security service that obtains information about a change to a security setting after the security setting has been changed.

6. The system of claim 5 wherein at least one of the sources comprises a log file filter that watches a log file for security setting changes, and when the log file indicates that a security setting has been changed, provides information about the change to the reactive processor component.

7. The system of claim 6 wherein the log file is written to by an antivirus engine.

8. The system of claim 6 wherein the log file is written to by a firewall engine.

9. The system of claim 6 wherein the log file is written to by an intrusion detection engine.

10. The system of claim 5 wherein at least one of the sources comprises a registry filter and monitor that watches a registry for security-related changes, and when a security-related setting in the registry has been changed, provides information about the change to the reactive processor component.

11. The system of claim 10 wherein the security-related setting in the registry is changed by a user-initiated event.

12. The system of claim 10 wherein the security-related setting in the registry is changed by a program-initiated event.

13. The system of claim 5 further comprising a unified interface, wherein the reactive processor component is coupled to the security advisor via the unified interface.

14. The system of claim 1 wherein at least one of the sources comprises a file monitor that detects an access-related request to a specified file and prevents access to that specified file.

15. The system of claim 14 wherein the file monitor detects the access-related request access based on a file identifier.

16. The system of claim 14 wherein the file monitor detects the access-related request access based on a file name.

17. The system of claim 14 wherein the file monitor detects the access-related request access based on a file signature.

18. The system of claim 14 wherein the file monitor detects the access-related request access based on a file attribute.

19. The system of claim 14 wherein the file monitor comprises a filter driver.

20. The system of claim 1 further comprising a proactive processor component coupled to the security advisor that detects a requested change to a security setting before a change to the security setting has occurred.

21. The system of claim 20 wherein the proactive processor component watches for requested changes to an operating system setting.

22. The system of claim 20 wherein the proactive processor component watches for request changes to an internet security setting.

23. The system of claim 20 wherein at least one of the sources comprises a file filter and monitor that watches for file-related request to at least one protected file, and a file-related request to a protected file is detected, provides information about the request to the reactive processor component.

24. The system of claim 20 wherein the proactive processor component watches for requested changes by hooking a windows message.

25. The system of claim 20 wherein the proactive processor component watches for requested changes by subscribing for events.

26. The system of claim 20 wherein the requested change is requested by a user-initiated event.

27. The system of claim 20 wherein the requested change is requested by a program-initiated event.

28. The system of claim 20 further comprising a unified interface, wherein the proactive processor component is coupled to the security advisor via the unified interface.

29. The system of claim 20 wherein the proactive processor component watches for requested changes to an application program setting.

30. The system of claim 1 wherein the security service is further configured to receive updates from a remote source.

31. The system of claim 1 wherein the security service is further configured to access policy information that alters at least one operation of the security service.

32. The system of claim 1 wherein the security service is further configured to access preference data to determine how to operate based on the security-related information.

33. The system of claim 32 wherein the preference data comprises user preference data.

34. The system of claim 32 wherein the preference data comprises action preference data.

35. The system of claim 34 wherein the action preference data indicates that a change that was made should be undone.

36. The system of claim 34 wherein the action preference data indicates that a change that is requested should be prevented.

37. The system of claim 34 wherein the action preference data indicates that data should be output to a user.

38. The system of claim 27 wherein the data output to the user comprises a prompt via which an instruction from the user may be received.

39. The system of claim 1 wherein the security service is further configured to output data to a log.

40. The system of claim 1 wherein the security service is further configured to output data corresponding to a security risk score.

41. In a computing environment, a method for monitoring the security of a computer system, the method comprising:
  receiving updates from a remote source to update security settings, the updates including information indicating actions which are to be performed automatically and information indicating actions which are to be performed after a preceding prompt, the actions comprising at least proactively blocking a change to a security setting and reactively undoing a change;
  monitoring in real time the security-related information of a plurality of sources of security-related information;
  obtaining information from one of the plurality of sources, the information related to a change to a security setting;
  obtaining policy information comprising time-based policies, geography based policies, and event triggered policies;
  accessing preference information to determine whether the information should be acted upon;

responding through event handling logic to user-initiated events and program-initiated events;

when the user preferences information indicates that the change should be acted upon, accessing action preference data to determine an action to take with respect to the information, the action being determined dynamically based on policy and knowledge of new security attacks, actual attacks, and preventative and reactive actions to take against each attack;

taking the determined action, the action being performed automatically when indicated as automatic by the preference data and the action being performed after a preceding prompt when so indicated by the preference data, the preceding prompt being determined based upon policy and upon downloaded prompt information;

logging security-related information;

processing the logged information to determine if an attack has been attempted or if a security level has been altered; and reporting the health of a monitored source to a user.

42. The method of claim 41 wherein the information indicates that a changes to a security setting is being requested, wherein the action preference data indicates that the change should be prevented, and further comprising, blocking the change.

43. The method of claim 41 wherein the information indicates that a change to a security setting has been made, wherein the action preference data indicates that the change should be undone, and further comprising, undoing the change.

44. The method of claim 41 wherein the information indicates that a change to a security setting is being requested, and wherein the action preference data indicates that the user should be notified about the requested change.

45. The method of claim 44 further comprising, notifying the user about the change.

46. The method of claim 41 further comprising, logging data corresponding to the information related to the change.

47. The method of claim 41 further comprising monitoring a log to obtain the information related to the change.

48. The method of claim 41 further comprising monitoring settings to obtain the information related to the change.

49. The method of claim 41 further comprising monitoring messages to obtain the information related to the change.

50. The method of claim 41 further comprising subscribing for an event to obtain the information related to the change.

51. The method of claim 41 further comprising accessing policy data.

52. The method of claim 41 further comprising communicating with a remote source to obtain updates.

53. The method of claim 41 further comprising outputting risk information corresponding to at least one level of security in the computing environment.

54. The method of claim 41 wherein the preference information indicates that the information should be acted upon, wherein accessing action preference data indicates that the user wants a notification, and further comprising, providing a notification to the user.

55. The method of claim 54 further comprising receiving an instruction from the user and acting upon the instruction.

56. A computer-readable storage medium having computer-executable instructions for performing the method of claim 41.

* * * * *